(12) United States Patent
Trujillo Rolon (10) Patent No.: US 11,660,929 B2
(45) Date of Patent: May 30, 2023

(54) HEADLINER AIR DUCT ASSEMBLY

(71) Applicant: Ford Global Technologies, LLC, Dearborn, MI (US)

(72) Inventor: Alfredo Ivan Trujillo Rolon, Benito Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 17/154,014

(22) Filed: Jan. 21, 2021

(65) Prior Publication Data

US 2022/0227203 A1    Jul. 21, 2022

(51) Int. Cl.
*B60H 1/00* (2006.01)
*B60R 13/02* (2006.01)

(52) U.S. Cl.
CPC ..... *B60H 1/00564* (2013.01); *B60R 13/0212* (2013.01)

(58) Field of Classification Search
CPC ............... B60H 1/00564; B60H 1/245; B60H 2001/00235; B60R 13/0212; B60R 13/0231; B60R 13/0225; B60R 13/02
USPC ......................... 296/214; 29/897.2; 454/137
See application file for complete search history.

(56) References Cited

U.S. PATENT DOCUMENTS

| | | | | |
|---|---|---|---|---|
| 6,062,635 A * | 5/2000 | Learman | ............ | B60H 1/00564 296/214 |
| 6,086,145 A * | 7/2000 | Wandyez | ............... | B60K 37/00 296/214 |
| 6,315,354 B1 * | 11/2001 | Tani | ...................... | B60R 13/025 296/214 |
| 6,780,097 B2 | 8/2004 | Shuttleworth et al. | | |
| 6,899,381 B1 * | 5/2005 | Fero | .................... | B60R 13/0225 296/214 |
| 7,334,834 B2 | 2/2008 | Hill et al. | | |
| 8,240,750 B2 | 8/2012 | Ludwig et al. | | |
| 2003/0234559 A1 * | 12/2003 | Dykman | ................ | B60H 1/245 296/214 |
| 2005/0202774 A1 * | 9/2005 | Lipke | ................. | B60H 1/00564 454/137 |
| 2011/0028077 A1 * | 2/2011 | Ludwig | ................. | B60H 1/245 454/143 |

(Continued)

FOREIGN PATENT DOCUMENTS

| JP | 2008044422 A | 2/2008 |
|---|---|---|
| JP | 5856870 B2 | 2/2016 |
| JP | 6152621 B2 | 6/2017 |

*Primary Examiner* — Joseph D. Pape
*Assistant Examiner* — Veronica M Shull
(74) *Attorney, Agent, or Firm* — Vichit Chea; Price Heneveld LLP (57) ABSTRACT

A vehicle headliner air duct assembly includes a headliner having a first surface and a second surface. A radiused edge is defined between the first surface and the second surface. A headliner duct is coupled to the first surface and the second surface of the headliner. The headliner duct defines an inlet. The inlet is disposed on the radiused edge. A connector duct is coupled to a vehicle body and at least partially overlaps the headliner duct proximate to the inlet to form a duct interface. The connector duct defines an outlet disposed on the radiused edge. The outlet is in fluid communication with the inlet via the duct interface. The duct interface is disposed on the radiused edge.

20 Claims, 10 Drawing Sheets

(56) References Cited

U.S. PATENT DOCUMENTS

2011/0127803 A1\* 6/2011 Ludwig .................. B60H 1/245
                                                        296/214
2013/0207420 A1\* 8/2013 Kumar ............... B60H 1/00564
                                                        296/217

\* cited by examiner

HEADLINER AIR DUCT ASSEMBLY

FIELD OF THE DISCLOSURE

The present disclosure generally relates to a headliner air duct assembly. More specifically, the present disclosure relates to a headliner air duct assembly for a vehicle.

BACKGROUND OF THE DISCLOSURE

Vehicles generally include air ducts to direct air into a passenger compartment. The air ducts may fluidly couple a heating, ventilation, and air conditioning system with the passenger compartment. Air vents may be disposed in various locations within the passenger compartment for directing air from the air ducts.

SUMMARY OF THE DISCLOSURE

According to at least one aspect of the present disclosure, a vehicle headliner air duct assembly includes a headliner having a first surface and a second surface. A radiused edge is defined between the first surface and the second surface. A headliner duct is coupled to the first surface and the second surface of the headliner. The headliner duct defines an inlet. The inlet is disposed on the radiused edge. A connector duct is coupled to a vehicle body and at least partially overlaps the headliner duct proximate to the inlet to form a duct interface. The connector duct defines an outlet disposed on the radiused edge. The outlet is in fluid communication with the inlet via the duct interface. The duct interface is disposed on the radiused edge.

According to another aspect of the present disclosure, a vehicle headliner assembly includes a headliner having a first surface and a second surface. A radiused edge is defined between the first surface and the second surface. A headliner duct is coupled to the first surface of the headliner. The headliner duct defines an inlet. A connector duct is coupled to the headliner duct. An outlet of the connector duct is in fluid communication with the inlet of the headliner duct to define an airflow path through a duct interface. The airflow path extends along a longitudinal extent of the headliner through the duct interface.

According to another aspect of the present disclosure, a method of manufacturing a vehicle air duct interface includes: proposing an angled cut plane along a radiused edge of a headliner; defining an intersection between the headliner and the angled cut plane; sweeping a surface of the headliner along the intersection; forming a headliner duct utilizing a sweep surface; blow molding a connector duct; and cutting the connector duct along the angled cut plane to define an outlet.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
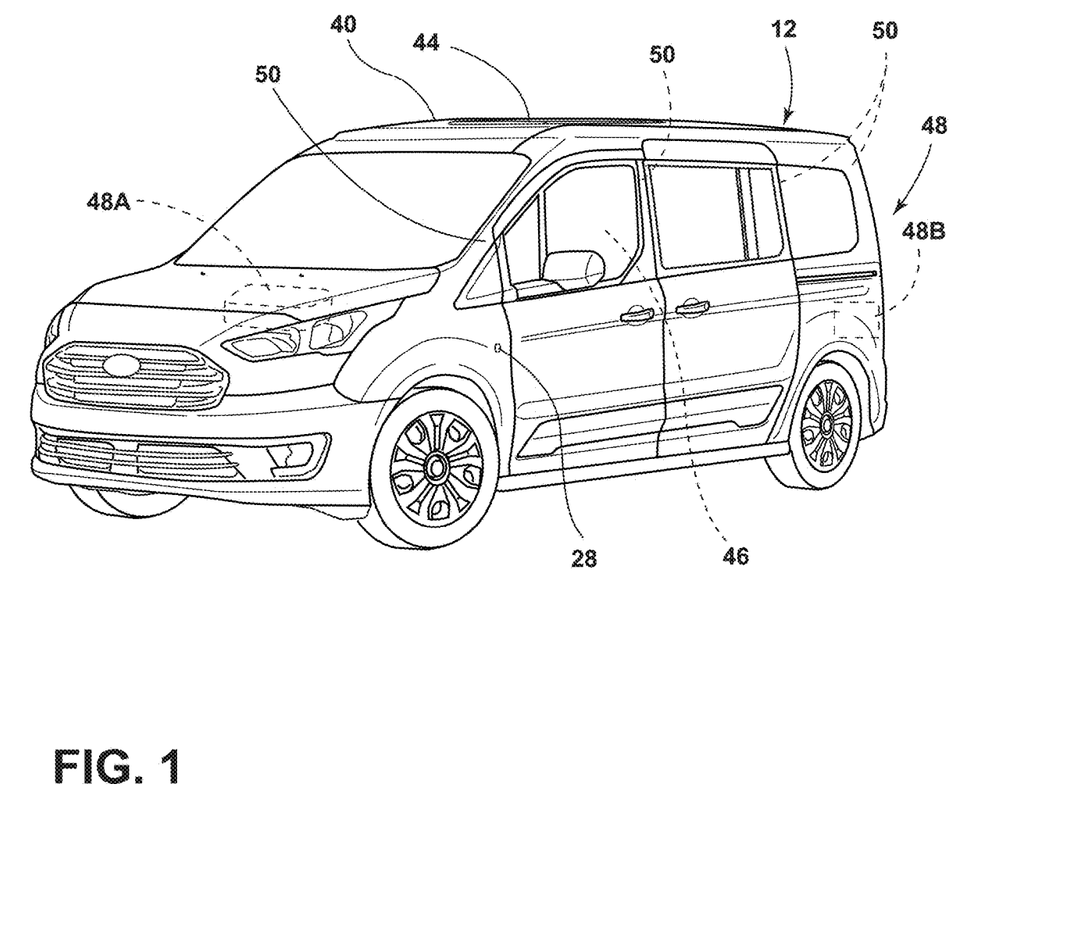
FIG. 1 is a front perspective view of a vehicle having a headliner air duct system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone;

A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-13, reference numeral 10 generally designates an air duct assembly 10 for a vehicle 12. A headliner 14 includes a first surface 16 and a second surface 18. A radiused edge 20 is defined between the first surface 16 and the second surface 18. A headliner duct 22 is coupled to the first surface 16 and the second surface 18 of the headliner 14. The headliner duct 22 defines an inlet 24, which is disposed on the radiused edge 20. A connector duct 26 is coupled to a vehicle body 28 and at least partially overlaps the headliner duct 22 proximate to the inlet 24 to define a duct interface 30. The connector duct 26 defines an outlet 32 disposed on the radiused edge 20. The outlet 32 is in fluid communication with the inlet 24 via the duct interface 30. The duct interface 30 is disposed on the radiused edge 20.

Figure 2:
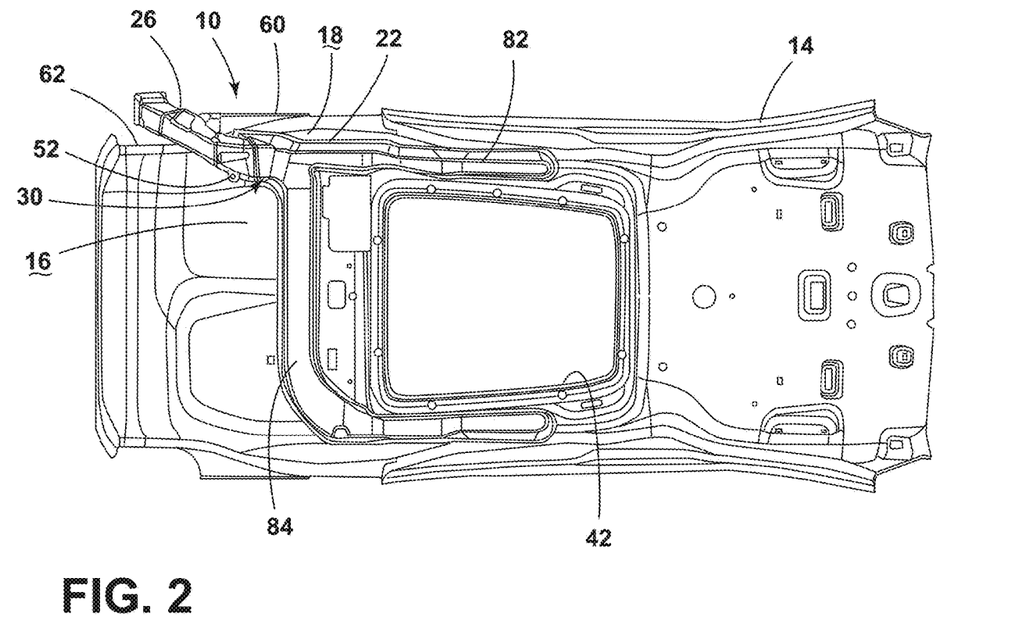
FIG. 2 is a top elevational view of a headliner duct assembly on a headliner, according to the present disclosure.

Referring to FIGS. 1 and 2, the vehicle 12 is illustrated as a van; however, the vehicle 12 may be a sedan, a sport utility vehicle, a van, a truck, a crossover, other styles of wheeled motor vehicles 12, or other types of vehicles 12 without departing from the teachings herein. The vehicle 12 may be a manually operated vehicle 12 (e.g., with a human driver), a fully autonomous vehicle 12 (e.g., with no human driver), or a partially autonomous vehicle 12 (e.g., operated with or without a human driver). The vehicle 12 may be utilized for personal or commercial purposes, such as for ride providing services (e.g., chauffeuring), transport, or ride-sharing surfaces.

The vehicle 12 includes the headliner 14, which is adhered or otherwise coupled to an interior surface of a roof 40 of the vehicle 12. The headliner 14 may define an aperture 42 for accommodating a sunroof 44 of the vehicle 12. Generally, the headliner 14 operates as a ceiling for an interior compartment 46 of the vehicle 12. The headliner 14 may also provide support for the air duct assembly 10, as well as other components, of the vehicle 12. The air duct assembly 10 at least partially extends between the headliner 14 and the roof 40 for providing air to the interior compartment 46 from proximate the roof 40.

According to various aspects, the air duct assembly 10 is coupled to the first surface 16 and the second surface 18 of headliner 14 to provide airflow to various locations within the interior compartment 46 of the vehicle 12. The first surface 16 and the second surface 18 may each be B-surfaces of the headliner 14. The term "B-surface" generally refers to a surface of any component within the vehicle 12 that is concealed or not contactable by a passenger within the vehicle 12 when the component is in an assembled state. In comparison, the term "A-surface" generally refers to a surface of any component within the vehicle 12 that is visible or contactable by the passenger within the vehicle 12 when the component is in the assembled state. Accordingly, the air duct assembly 10 extends between the B-surfaces of the headliner 14 and the roof 40 and may be substantially obscured from the view of the passengers in the interior compartment 46.

Referring still to FIGS. 1 and 2, the air duct assembly 10 directs air from a heating, ventilation, and air conditioning (HVAC) system 48 to the interior compartment 46. The HVAC system 48 may be configured one or both of an HVAC unit 48A and an auxiliary HVAC unit 48B. The HVAC system 48 generally cleans, cools, heats, regulates, ventilates, and/or dehumidifies the air directed into the interior compartment 46. The air travels along an airflow path from the HVAC system 48, through the air duct assembly 10, and is expelled from vents or registers operably coupled to the headliner 14 into the interior compartment 46.

The HVAC unit 48A is generally positioned in a vehicle-forward portion of the vehicle 12. Many commercial vehicles 12 or larger vehicles 12 (e.g., sport utility vehicles) include both the HVAC unit 48A disposed in the vehicle-forward portion of the vehicle 12 and the auxiliary unit 48B disposed in a vehicle-rearward portion of the vehicle 12 proximate to a quarter panel trim of the vehicle body 28. The auxiliary HVAC unit generally operates fully on electric power.

The air duct assembly 10 generally includes the headliner duct 22 in fluid communication with the connector duct 26. The connector duct 26 directs the air from the HVAC system 48 to the headliner duct 22. The connector duct 26 is generally coupled to the vehicle body 28. In various examples, the connector duct 26 is coupled to a pillar 50 defined by the vehicle body 28 and may be disposed within a portion of the vehicle body 28, behind a trim panel, or a combination thereof to be substantially obscured from view. In the illustrated example, the connector duct 26 is provided air by the auxiliary HVAC unit 48B. In such examples, the connector duct extends through at least one of a C-pillar and a D-pillar of the vehicle body 28. In examples where the connector duct 26 is provided air from the HVAC unit 48A, the pillar 50 may be an A-pillar in the vehicle-forward portion of the vehicle body 28. It is contemplated that the connector duct 26 may extend to the headliner 14 in a variety of locations without departing from the teachings herein.

The connector duct 26 may include at least one coupling flange 52. The coupling flange 52 extends outward from the connector duct 26 to abut the headliner 14 or the vehicle body 28. The coupling flange 52 may be utilized to couple, or otherwise engage, the connector duct 26 to the headliner 14 or the vehicle body 28, depending on the location of the coupling flange 52 on the connector duct 26.

The connector duct 26 extends from the duct interface 30, over the headliner 14, and beyond an outer edge 60 of the headliner 14. The outer edge 60 of the headliner 14 defines an indent 62 and the connector duct 26 extends through the indent 62 toward the HVAC system 48. The connector duct 26 generally extends substantially vertically along the vehicle body 28, through the indent 62, and then substantially horizontally along the headliner 14 to couple with the headliner duct 22 (see FIG. 4). An end of the connector duct 26 that engages the headliner duct 22 is coupled to the first surface 16, the second surface 18, and the radiused edge 20 of the headliner 14. The end that engages the headliner duct 22 (e.g., the more horizontal portion) may have a different configuration than the more vertical portion that engages the vehicle body 28 in order to define the duct interface 30. The vertically oriented portion of the connector duct 26 may have different configurations based on the configuration of the vehicle 12.

Figure 3:
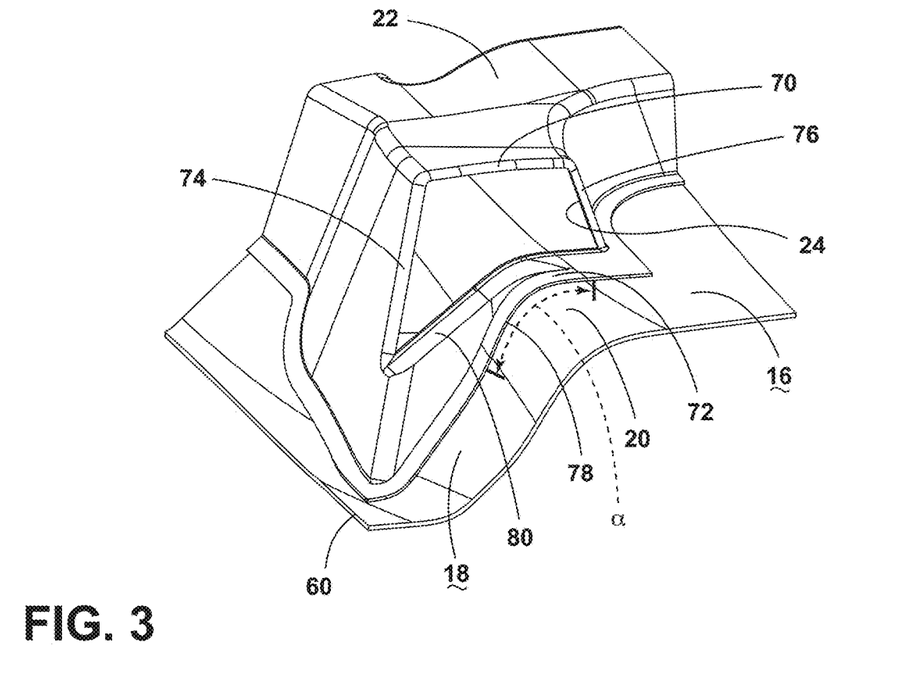
FIG. 3 is a partial side perspective view of a headliner duct coupled to a headliner, according to the present disclosure.

Referring still to FIG. 2, as well as FIG. 3, as previously stated, the headliner 14 includes the first surface 16 and the second surface 18. The second surface 18 extends at an angle toward the interior compartment 46 from the first surface 16. An obtuse angle a is defined between the first surface 16 and the second surface 18.

Generally, the second surface 18 is disposed proximate to the outer edge 60 of the headliner 14 and the first surface 16 is more centrally located on the headliner 14. The radiused edge 20 is defined between the first surface 16 and the second, sloped surface 18. Accordingly, the radiused edge 20 is generally defined proximate to the outer edge 60 of the headliner 14. A radius of the radiused edge 20 corresponds with the obtuse angle a defined between the first and second surfaces 16, 18. The radiused edge 20 generally extends around at least a substantial portion, or the entirety, of a perimeter of the first surface 16.

The headliner duct 22 is coupled to the first surface 16, the second surface 18, and the radiused edge 20 on the headliner 14. The headliner duct 22 includes a first side 70 defining a first edge of the inlet 24 and a second side 72 defining a second, opposing edge of the inlet 24. Generally, the first side 70 of the headliner duct 22 is an upper side disposed proximate to the roof 40, while the second side 72 is a lower side disposed proximate to the headliner 14. The first side 70 may extend over the headliner 14 and over the vents or registers to deliver air to the interior compartment 46. In comparison, the second side 72 may extend vertically between the headliner 14 and the inlet 24 and horizontally outward (e.g., toward the connector duct 26) from the vertical section to engage the headliner 14, and may not otherwise extend across the headliner 14.

Referring still to FIGS. 2 and 3, the headliner 14 also includes third and fourth sides 74, 76 that partially define the inlet 24. The third and fourth sides 74, 76 couple with the first side 70 and the second side 72 to define the inlet 24. However, as previously noted, the second side 72 may not extend along the headliner 14 toward the vents. In locations of the headliner duct 22 not defining the inlet 24 (e.g., along a length thereof extending toward the vents), the third and fourth sides 74, 76 may extend between the first side 70 and the headliner 14 to define an airflow path through the headliner duct 22. The third and fourth sides 74, 76 may be adhered or otherwise directly coupled to the headliner 14. In such configurations, the airflow path is primarily defined by the first side 70, the third side 74, the fourth side 76, and the headliner 14, while the inlet 24 is defined by the first side 70, the second side 72, the third side 74, and the fourth side 76 of the headliner duct 22.

A first edge 78 of the second side 72 of the headliner duct 22 is coupled to the first surface 16, the second surface 18, and the radiused edge 20. Accordingly, the first edge 78 defines a curve that corresponds with the curve or radius of the radiused edge 20 and a slope that corresponds with the slope of the second surface 18. A second edge 80 of the second side 72 defines a curve and a slope, different from the curve and the slope of the first edge 78. The second edge 80 had a first height over the first surface 16 of the headliner 14 and a second, greater height over the second surface 18. The curve and the slope defined by the second edge 80 are each shallower than the first edge 78, contributing to the increase in height of the second side 72 of the headliner duct 22 over the second surface 18 relative to the second side 72 over the first surface 16. The configuration of the second side 72 is determined through sweeping the first and second surface 16, 18 and the radiused edge 20 of the headliner 14 as discussed in further detail herein.

Referring still to FIGS. 2 and 3, the first side 70 of the headliner duct 22 is generally parallel with the first surface 16 of the headliner 14. The first side 70 has a width that is less than a width of the second side 72. The third and fourth sides 74, 76 extend between the first and second sides 70, 72. As the width of the second side 72 is greater than the width of the first side 70, the third and fourth sides 74, 76 of the headliner duct 22 extend at an angle from the first side 70 to the second side 72. The third and fourth sides 74, 76 each extend outward, at obtuse angles from the first side 70. The third and fourth sides 74, 76 may extend at the same angle or different angles depending on the configuration of the headliner 14. The third side 74 is disposed substantially over the first surface 16 of the headliner 14. In comparison, the fourth side 76 is disposed substantially over the second surface 18 of the headliner 14. Due to the sloping nature of the second surface 18, the fourth side 76 has a height greater than a height of the third side 74 of the headliner duct 22.

The configuration of the sides of the headliner duct 22 generally dictates the shape of the inlet 24. An upper edge of the inlet 24 defined by the first side 70 of the headliner duct 22 is generally horizontal. Lateral edges of the inlet 24 extend at an outward angle relative to the upper edge of the inlet 24. A bottom edge of the inlet 24 is defined by the second edge 80 of the second side 72 of the headliner duct 22. Accordingly, the bottom edge of the inlet 24 curves with the radiused edge 20 and slopes with the second surface 18. As such, an inner side of the inlet 24 over the first surface 16 has a height less than an outer side of the inlet 24 over the second surface 18. The asymmetrical shape of the inlet 24 maximizes the cross-sectional shape of the inlet 24 and thereby maximizes the airflow through the inlet 24. Additionally, the inlet 24 opens in a fore-aft direction. Accordingly, air flowing through the inlet 24 into the headliner duct 22 is traveling in the fore-aft direction. The fore-aft direction is generally parallel with or extends along a longitudinal extent of the headliner 14.

Referring still to FIGS. 2 and 3, the headliner duct 22 includes a first branch 82 and a second branch 84 extending from the duct interface 30 (e.g., proximate the inlet 24). The first branch 82 extends from the duct interface 30 in the fore-aft direction along the headliner 14. Accordingly, airflow is directed through the inlet 24 and continues along the first branch 82 in the fore-aft direction. The second branch 84 extends in a cross-car direction from the duct interface 30. When the second branch 84 reaches a position proximate to the opposing outer edge 60 of the headliner 14, the second branch 84 extends in the fore-aft direction across at least the first surface 16 of the headliner 14. Accordingly, air travels in the fore-aft direction through the inlet 24, in the cross-car direction through a portion of the second branch 84, and then again in the fore-aft direction along a portion of the second branch 84. The first branch 82 and the second branch 84 generally extend, at least partially, on opposing sides of the aperture 42 defined in the headliner 14, and accordingly, on opposing sides of the sunroof 44 (FIG. 1).

Figure 4:
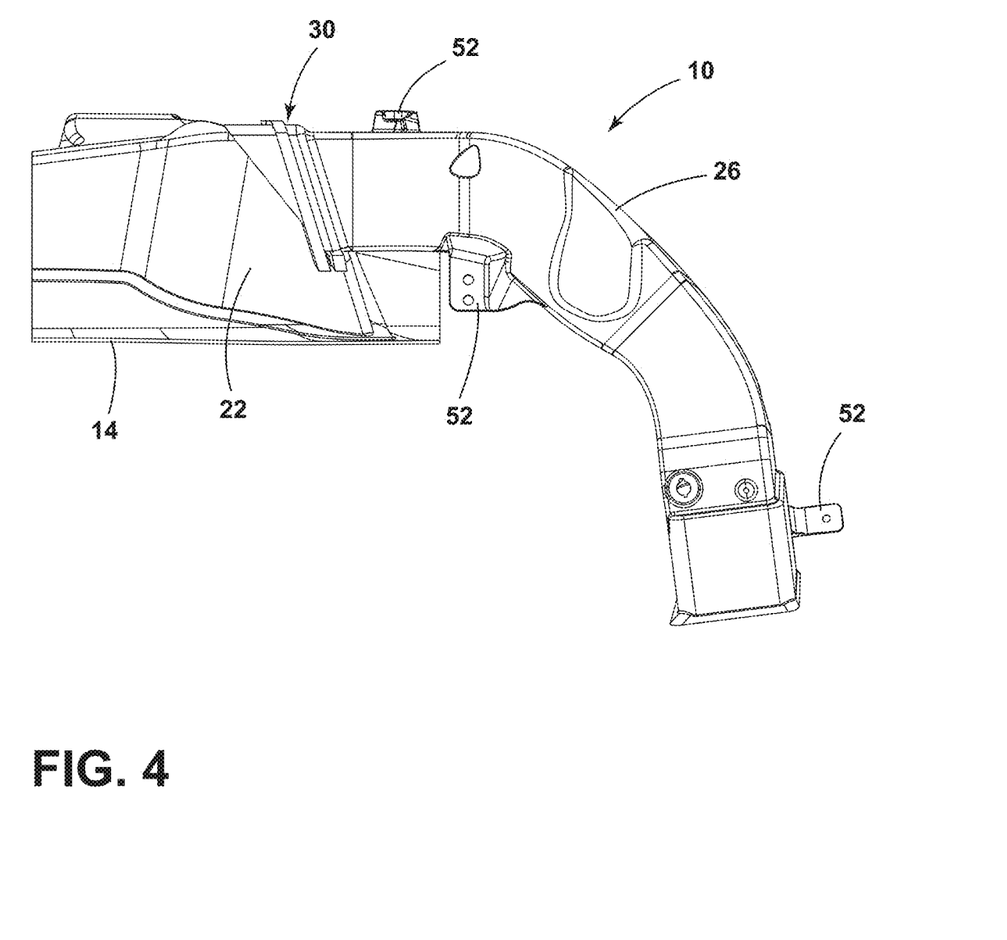
FIG. 4 is a side elevational view of a duct interface between a headliner duct and a connector duct, according to the present disclosure.
Figure 5:
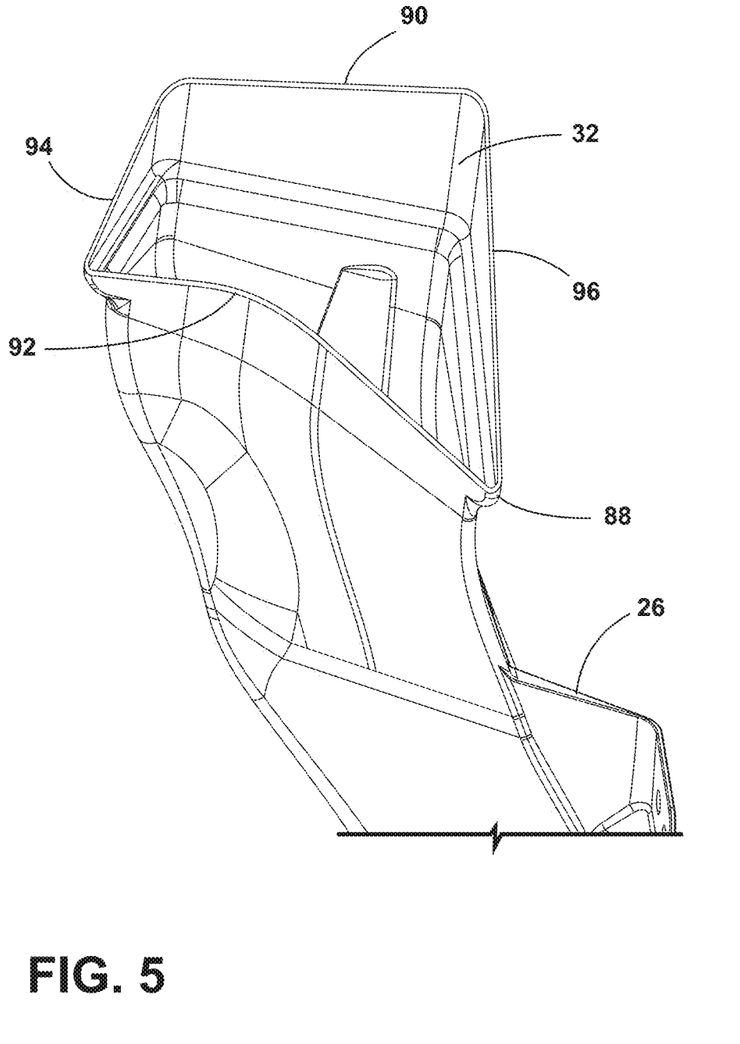
FIG. 5 is a bottom perspective view of a connector duct, according to the present disclosure.
Figure 6:
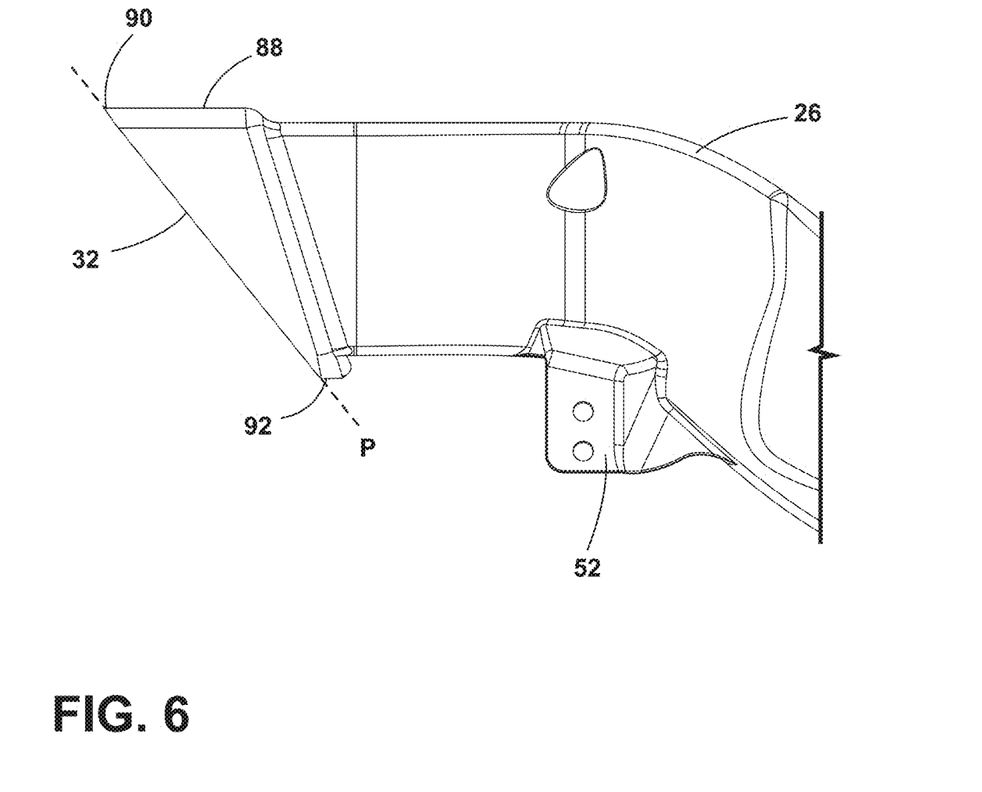
FIG. 6 is a side elevational view of a connector duct with an outlet defines along a single plane, according to the present disclosure.

Referring to FIGS. 4-6, the end of the connector duct 26 may also be referred to as a duct tip 88, which is the portion of the connector duct 26 that couples with the headliner duct 22 proximate the inlet 24 to provide fluid communication with the HVAC system 48 (FIG. 1). The duct tip 88 generally has a different geometry than the remainder of the connector duct 26 to couple with the headliner duct 22. The duct tip 88 of the connector duct 26 defines the outlet 32, which has a shape and a size that corresponds with the inlet 24 of the headliner duct 22. At least the duct tip 88 of the connector duct 26 extends over the radiused edge 20 of the headliner 14, similar to the headliner duct 22 previously described.

A first side 90 of the duct tip 88 is generally an upper side disposed proximate the roof 40 and spaced from the headliner 14. A second side 92 of the duct tip 88 is a lower side disposed proximate the headliner 14. The second side 92 of the duct tip 88 defines a curve and a slope that corresponds with the second edge 80 of the second side 72 of the headliner duct 22 that defines the inlet 24. In this way, the second side 92 the duct tip 88 defines a curve and a slope shallower than the curve of the radiused edge 20 and the slope of the second surface 18. However, the second side 92 curves and slopes to mate with the curved and sloped configuration of the second side 72 of the headliner duct 22.

A third side 94 of the duct tip 88 extends between the first and second sides 90, 92 and is disposed over the first surface 16 of the headliner 14. A fourth side 96, opposing the third side 94, extends between the first and second sides 90, 92 of the duct tip 88 and is disposed over the second surface 18 of the headliner 14. Due to the slope of the second surface 18, the fourth side 96 has a height greater than a height of the third side 94. The sides of the duct tip 88 define the size and shape of the outlet 32. The configuration of the outlet 32 maximizes airflow through the outlet 32. Similar to the inlet 24, a first portion of the outlet 32 disposed over the first surface 16 has a height less than a height of a second portion of the outlet 32 disposed over the second surface 18.

Referring still to FIGS. 4-6, the first side 90 of the duct tip 88 of the connector duct 26 extends beyond an edge of the second side 92 that defines the outlet 32. Accordingly, the outlet 32 is defined on an angled plane p that extends between the first and second sides 90, 92. The outlet 32 is defined on a single plane p, which may maximize efficiency during the manufacturing process. A single cut may be utilized to define the outlet 32 along the angled plane p. The outlet 32 opens to provide airflow in the fore-aft direction. Accordingly, as air travels through the outlet 32 and into the inlet 24, the air is flowing parallel with the longitudinal extent of the headliner 14.

Figure 7:
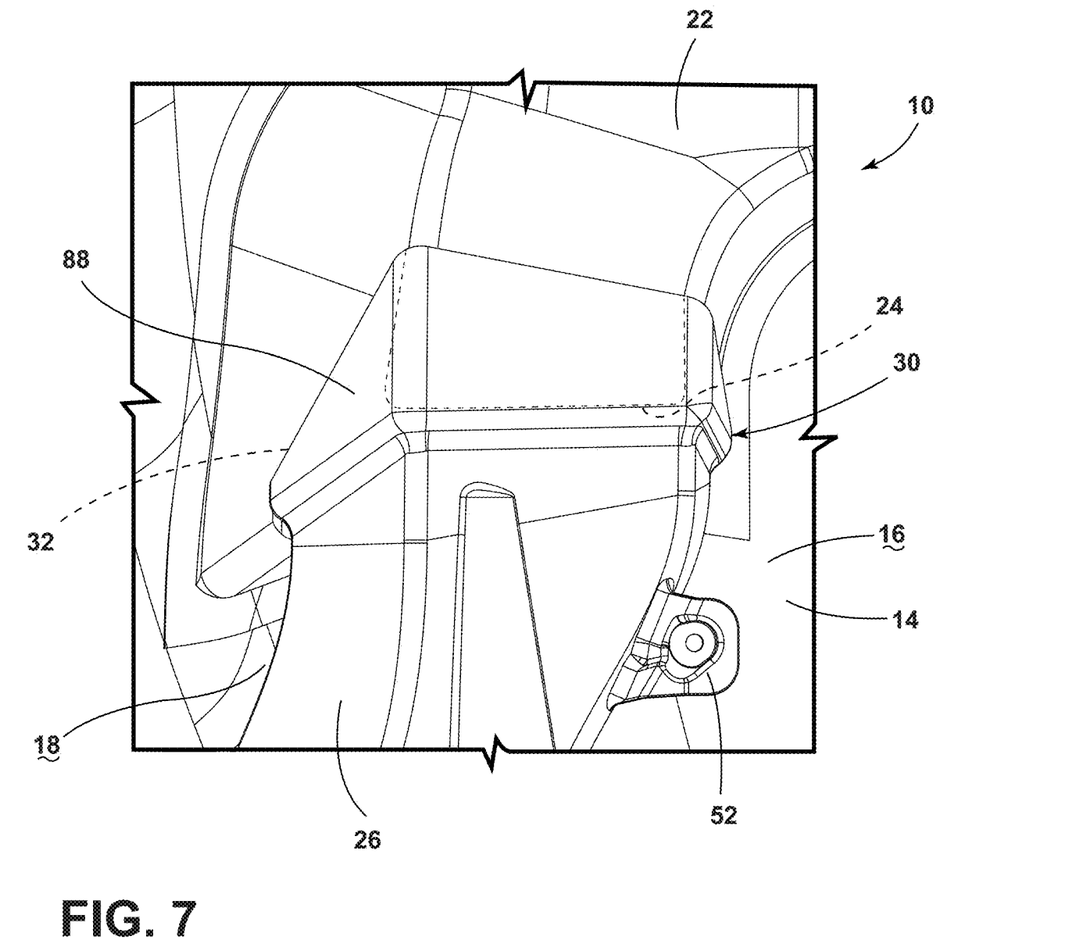
FIG. 7 is a top elevational view of a duct interface between a headliner duct and a connector duct, according to the present disclosure.

Referring to FIG. 7, the angled outlet 32 of the connector duct 26 allows the duct tip 88 of the connector duct 26 to extend partially over and overlap the headliner duct 22. The first side 90 of the connector duct 26 overlaps the first side 70 of the headliner duct 22. The distance of overlap of the first sides 70, 90 is generally in a range of about 10 mm to about 30 mm. The third and fourth sides 94, 96 of the connector duct 26 also overlap the third and fourth sides 74, 76 of the headliner duct 22. The overlapping of the connector duct 26 with the headliner duct 22 defines the duct interface 30 for directing air to the headliner duct 22. In certain aspects, the configuration of the connector duct 26 allows the assembly of the headliner 14 to the connector duct 26 with a vertical movement.

Due to the overlapping, the headliner duct 22 at least partially extends through the outlet 32 and into the connector duct 26 to define the duct interface 30. Each of the inlet 24, the outlet 32, and the duct interface 30 are disposed on the radiused edge 20. Additionally, the duct interface 30 is positioned to direct airflow in the fore-aft direction. The duct interface 30 is generally disposed proximate the outer edge 60 of the headliner 14 to maximize space for other components proximate to the roof 40. In the illustrated configuration, the duct interface 30 is disposed proximate a side outer edge 60 adjacent to the indent 62.

Referring to FIGS. 1-7, when assembled within the vehicle 12, the connector duct 26 directs the air from the HVAC system 48 to the headliner duct 22. The headliner duct 22 is in fluid communication with vents or registers operably coupled headliner 14, which direct air into the interior compartment 46. The duct interface 30 is disposed proximate to the outer edge 60 of the headliner 14 and on the radiused edge 20. The configuration of the headliner duct 22 and the connector duct 26 allows the duct interface 30 to be disposed on the radiused edge 20, rather than a flat surface. The duct interface 30 directs air in the fore-aft direction and parallel with, or along, the longitudinal extent of the headliner 14. Additionally, the configuration of the air duct assembly 10 maximizes space on the headliner 14 or proximate to the roof 40 for other components of the vehicle 12.

Referring to FIGS. 8-12, the duct interface 30 may be designed using computer software, such as a computer-aided design (CAD) software. Utilizing the CAD software, the curve and slope of the headliner duct 22 and the connector duct 26 may be designed, as well as the overlap between the connector duct 26 and the headliner duct 22 (e.g., the duct interface 30). A digital design of the headliner 14 with the radiused edge 20 is provided in the CAD software. A cut plane 100 that extends through the radiused edge 20 is proposed. The cut plane 100 generally extends in the cross-car direction through the radiused edge 20. The cut plane 100 extends at an angle, such that an obtuse angle β is defined between the first surface 16 of the headliner 14 and the cut plane 100 on the side of the cut plane 100 where the connector duct 26 will be positioned (e.g., generally the vehicle-forward direction).

Figure 8:
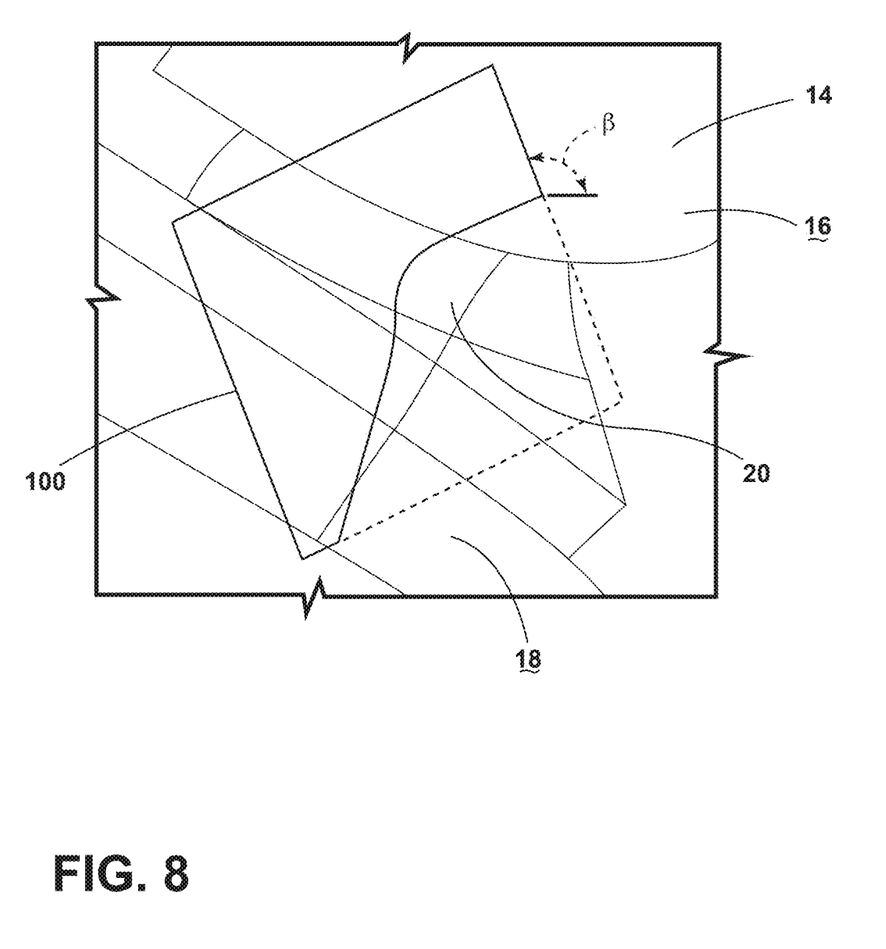
FIG. 8 is a schematic view of a cut plane extending through a headliner using computer-aided design software, according to the present disclosure.
Figure 9:
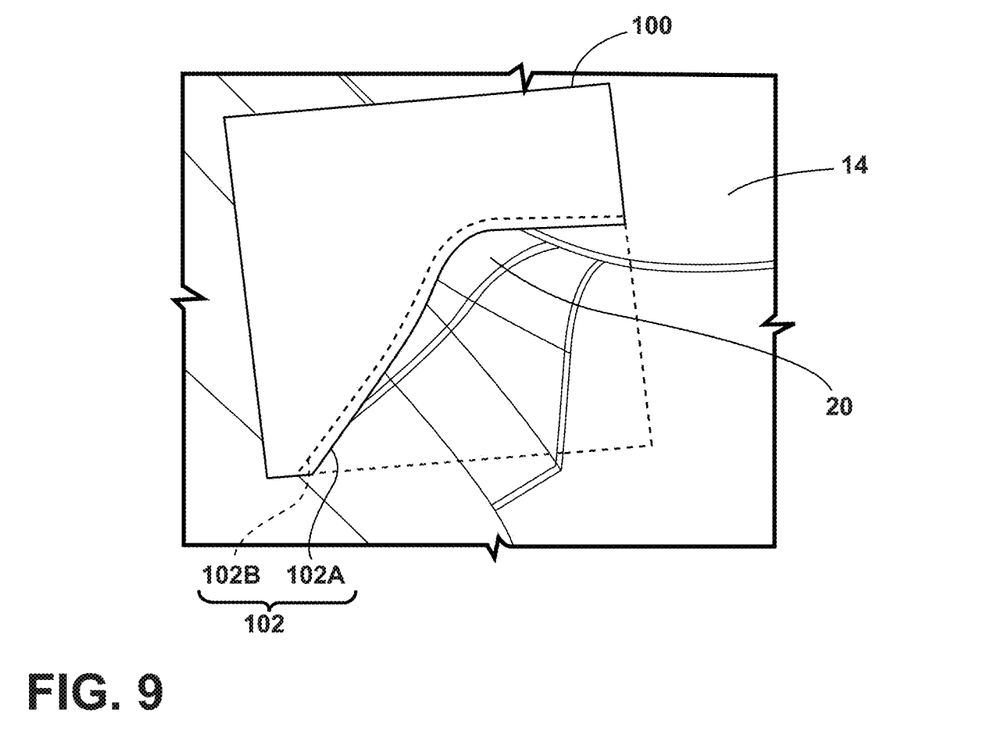
FIG. 9 is a schematic view of an intersection between a cut plane and a headliner using computer-aided design software, according to the present disclosure.

The cut plane 100 corresponds with the plane p at which the connector duct 26 is to be cut to define the angled outlet 32. Once the cut plate 100 is proposed, an intersection 102 between the headliner 14 and the cut plane 100 is computed with the CAD software. The intersection 102 generally includes two different configurations, which include an actual intersection 102A and adjusted intersection 102B. The actual intersection 102A represents actual locations across the cut plane 100 where the cut plane 100 crosses the headliner 14. The adjusted intersection 102B is offset from the actual intersection 102A. The adjusted intersection 102B accounts for a thickness of at least one of the headliner 14, the headliner duct 22, the connector duct 26, and a seal between the headliner 14 and the headliner duct 22.

Figure 10:
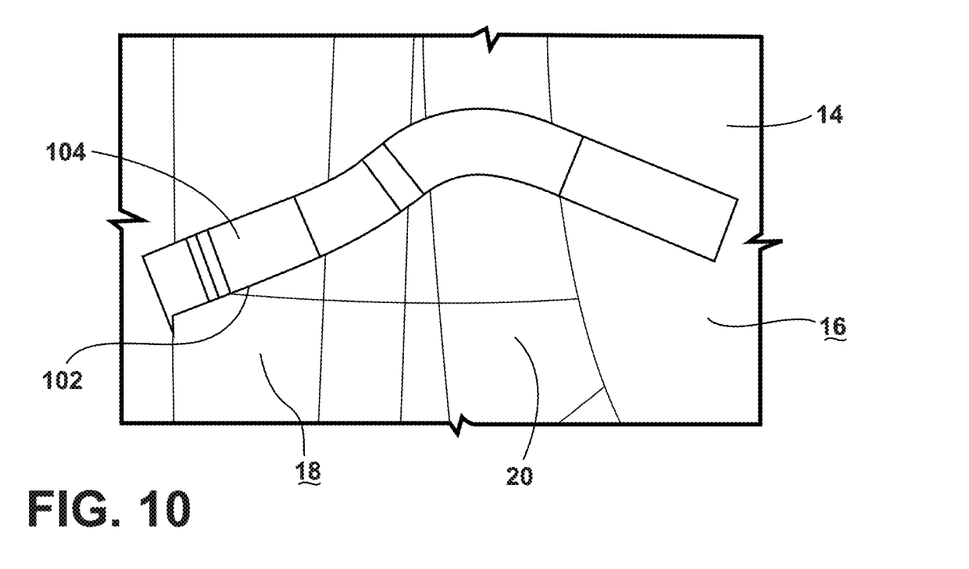
FIG. 10 is a schematic view of a sweep surface using computer-aided design software, according to the present disclosure.

As best illustrated in FIG. 10, the intersection 102 is utilized to sweep the surfaces of the headliner 14 to define a sweep surface 104. Generally, the adjusted intersection 102B is utilized to define the sweep surface 104; however, it is contemplated that the actual intersection 102A may be utilized without departing from the teachings herein. The sweep surface 104 is defined using a draft angle. The draft angle is generally in a range of about 10° to about 20° relative to a z-axis/molding tool die vector. The sweep surface 104 may be utilized to define or create the second side 72 of the headliner duct 22 that extends vertically between the headliner 14 and the inlet 24.

Figure 11:
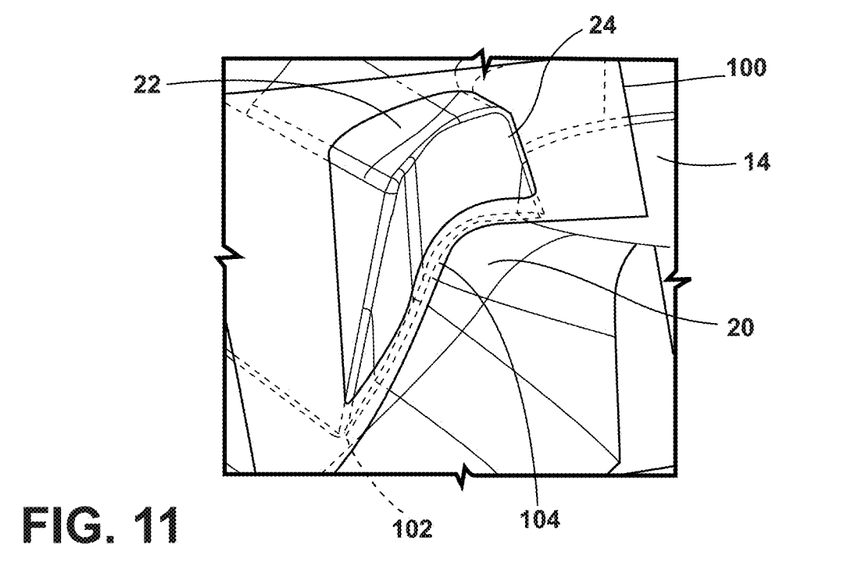
FIG. 11 is a schematic view of a headliner duct extending through a cut plane using computer-aided design software, according to the present disclosure.

As best illustrated in FIG. 11, using the sweep surface 104, a digital design of the headliner duct 22 may be created. As previously stated, the second side 72 is designed using the sweep surface 104. The remainder of the end of the headliner duct 22 extends along the single plane to define the inlet 24 and can be designed in the CAD software. Accordingly, the inlet 24 is defined on a single plane, which maximizes manufacturing efficiency. The third and fourth sides 74, 76 of the headliner duct 22 extend vertically from the sweep surface 104 and through the angled cut plane 100. The distance that the headliner duct 22 extends through the cut plane 100 corresponds with the extent of the overlap between the headliner duct 22 and the connector duct 26 (e.g., the duct interface 30).

Figure 12:
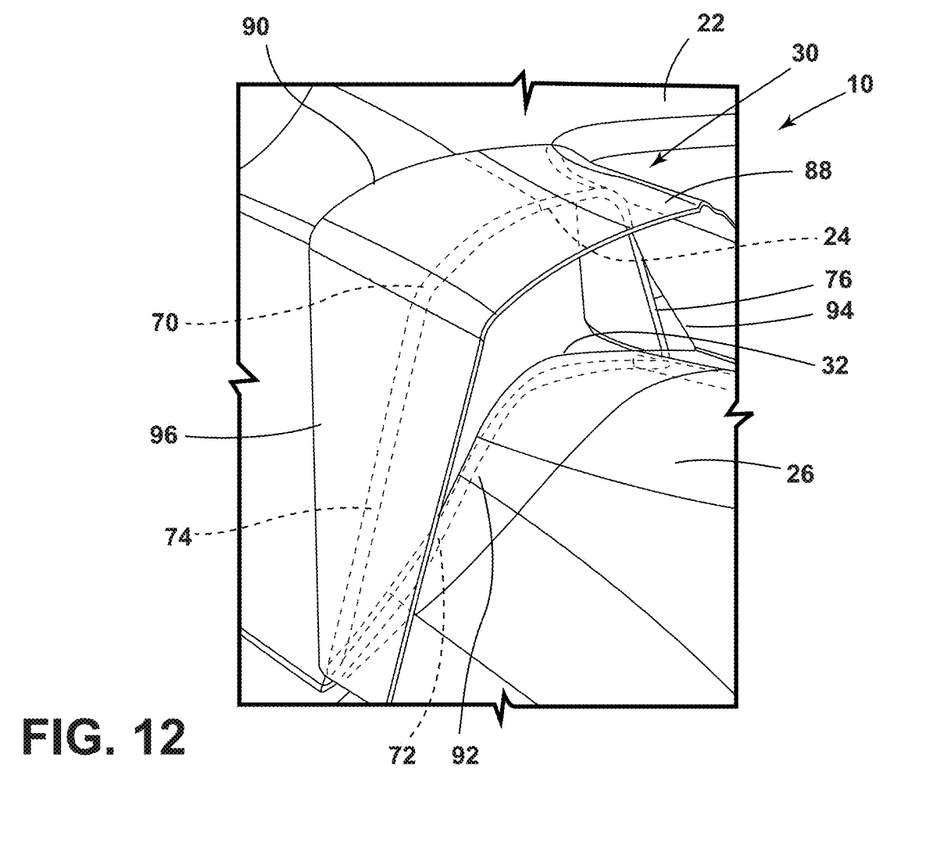
FIG. 12 is a schematic view of a duct interface using computer-aided design software, according to the present disclosure.

As best illustrated in FIG. 12, a digital design of the duct tip 88 of the connector duct 26 that defines the outlet 32 may be created. The outlet 32 is defined along the cut plane 100. The configuration of the outlet 32 may be adjusted by adjusting the angle of the cut plane 100. The cut plane 100 is adjusted to provide the selected overlap between the connector duct 26 and the headliner duct 22.

Referring still to FIGS. 8-12, once the design of the headliner duct 22 and the connector duct 26 have been finalized in the CAD software, the headliner duct 22 and the connector duct 26 may be blow-molded. The connector duct 26 is cut along the cut plane 100, using a single cut, to define the angled outlet 32. The headliner duct 22 is coupled to the headliner 14. The connector duct 26 is coupled to the vehicle body 28 (FIG. 1) and/or the headliner 14 and is positioned to overlap the headliner duct 22. The headliner duct 22 extends at least partially through the outlet 32, such that an outer surface of the first side 70 of the headliner duct 22 abuts an inner surface of the first side 90 of the connector duct 26. An adhesive or other coupling method may be utilized to secure the headliner duct 22 with the connector duct 26 without departing from the teachings herein.

Figure 13:
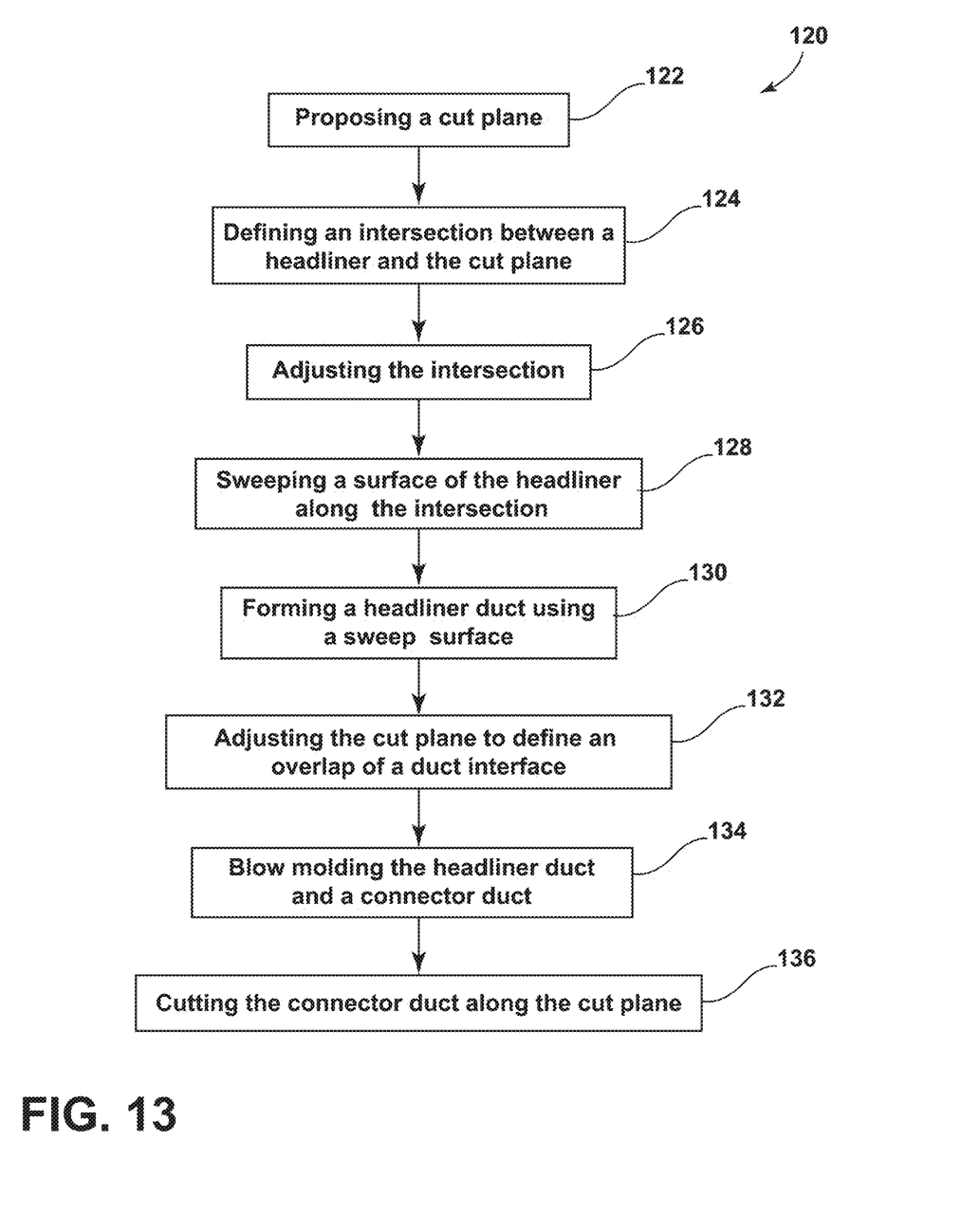
FIG. 13 is a method of manufacturing a duct interface for a headliner duct assembly, according to the present disclosure.

Referring to FIG. 13, as well as FIGS. 1-12, a method 120 of manufacturing the duct interface 30 of the air duct assembly 10 includes a step 122 of proposing the cut plane 100 using the CAD software. The cut plane 100 extends through the radiused edge 20 of the headliner 14 defined between the first and second surfaces 16, 18 of the headliner 14. Generally, the cut plane 100 defines the obtuse angle β with the first surface 16 of the headliner 14. In step 124, in the CAD software, the intersection 102 is defined between the headliner 14 and the cut plane 100. The intersection 102 is defined by each point along the cut plane 100 that intersects with the headliner 14, forming a line. In step 126, the intersection 102 is adjusted providing the adjusted intersection 102B. The adjusted intersection 102B in response to a thickness of the various components of the air duct assembly 10 and/or the headliner 14 and is offset from the actual intersection 102A. The components include the thickness of the headliner duct 22, the thickness of the headliner 14, the thickness of a seal, and/or the thickness of the connector duct 26.

In step 128, the first and second surfaces 16, 18 and the radiused edge 20 are swept using the CAD software. The sweeping is conducted along the intersection 102 to form the sweep surface 104. In step 130, the headliner duct 22 is designed or formed using the sweep surface 104. The sweep surface 104 is used to define the second side 72 of the headliner duct 22, which vertically extends between the headliner 14 and the inlet 24. The headliner duct 22 extends partially through the cut plane 100. The second side 72 aligns with the sweep surface 104, and the third and fourth sides 74, 76 extend vertically from the sweep surface 104 and through the cut plane 100.

In step 132, the cut plane 100 is adjusted to a predefined angle to define the selected overlap between the headliner duct 22 and the connector duct 26. The distance the digital rendering of the headliner duct 22 extends through the cut plane 100 in the CAD software corresponds with the overlap that will occur with the connector duct 26 when the air duct assembly 10 is manufactured and assembled. In step 134, the headliner duct 22 and the connector duct 26 may be blow-molded using the designed configurations from the CAD software. In step 136, the cut plane 100 may be utilized to cut the connector duct 26 to define the angled outlet 32. A single cut may be used to define the outlet 32 to maximize efficiency in the manufacturing process while reducing costs. It is understood that the steps of the method 120 may be performed in any order, simultaneously and/or omitted without departing from the teachings herein.

Referring to FIGS. 1-13, once the headliner duct 22 is blow-molded and the connector duct 26 is blow-molded and cut, the air duct assembly 10 may be assembled on the headliner 14. The headliner duct 22 may be coupled directly to the headliner 14 through adhesives or other practicable methods. The connector duct 26 is positioned to partially overlap the headliner duct 22, thereby forming the duct interface 30. The connector duct 26 is coupled to the vehicle body 28, the headliner 14, the headliner duct 22, or a combination thereof. The configuration of the duct interface 30 generally provides a direct connection between the connector duct 26 and the headliner duct 22. Moreover, the configuration of the duct interface 30 and the duct tip 88 allows the headliner 14 to be assembled to the connector duct 26 with a vertical movement and generally without a horizontal movement. The headliner 14, with the air duct assembly 10, may then be installed within the vehicle 12. Further, the configuration of the duct interface 30 provides for the airflow path extending through the duct interface 30 to be in the fore-aft direction and over the radiused edge 20.

Use of the present device may provide for a variety of advantages. For example, the inlet 24 of the headliner duct 22 may be arranged over the radiused edge 20 defined by the headliner 14. Additionally, the outlet 32 of the connector duct 26 may be arranged over the radiused edge 20 of the headliner 14. Further, the connector duct 26 may partially overlap the headliner duct 22 to define the duct interface 30. The configuration of the inlet 24, the outlet 32, and the duct interface 30 may provide the airflow in the fore-aft direction through the duct interface 30, which is generally parallel with the longitudinal extent of the headliner 14. Moreover, the duct interface 30 may be arranged on the radiused edge 20. Each of the headliner duct 22 and the connector duct 26 may be shaped to follow the slope of the second surface 18 of the headliner 14 and the curve or radius of the radiused edge 20. The configurations allow the duct interface 30 to be positioned on the radiused edge 20, rather than a flat surface. Further, the connector duct 26 can be cut on a single plane p in a single direction. Also, the configuration of the headliner duct 22 and the connector duct 26 maximizes a cross-sectional area for the airflow to pass through and, thereby, maximizes the airflow through the duct interface 30. Additionally, the air duct assembly 10 may maximize space on the headliner 14 to provide space for other components of the vehicle 12. Moreover, the configuration of the duct interface 30 minimizes a pressure drop between the connector duct 26 and the headliner duct 22. Additional benefits or advantages may be realized and/or achieved.

According to various examples, a vehicle headliner air duct assembly includes a headliner having a first surface and a second surface. A radiused edge is defined between the first surface and the second surface. A headliner duct is coupled to the first surface and the second surface of the headliner. The headliner duct defines an inlet. The inlet is disposed on the radiused edge. A connector duct is coupled to a vehicle body and at least partially overlaps the headliner duct proximate to the inlet to form a duct interface. The connector duct defines an outlet disposed on the radiused edge. The outlet is in fluid communication with the inlet via the duct interface. The duct interface is disposed on the radiused edge. Embodiments of the present disclosure may include one or a combination of the following features:

the outlet is defined on a single plane;
the outlet of the connector duct and the duct interface are arranged on the headliner to direct airflow in a fore-aft direction;
the headliner duct includes a first branch and a second branch, wherein the first branch extends in a fore-aft direction along the headliner, and wherein the second branch extends in a cross-car direction and the fore-aft direction along the headliner;
the first branch and the second branch are at least partially disposed on opposing sides of a sunroof, and wherein the duct interface directs airflow in the fore-aft direction;
the connector duct includes a first side and a second side, wherein the first side is disposed proximate the headliner and the second side opposes the first side, and wherein the second side extends beyond an edge of the first side that partially defines the outlet; and
the connector duct includes a third side and a fourth side extending between the first side and the second side, wherein the third side is disposed over the second surface of the headliner and the fourth side is disposed over the first surface of the headliner, and wherein the third side has a height greater than a height of the fourth side.

According to various examples, a vehicle headliner assembly includes a headliner having a first surface and a second surface. A radiused edge is defined between the first surface and the second surface. A headliner duct is coupled to the first surface of the headliner. The headliner duct defines an inlet. A connector duct is coupled to the headliner duct. An outlet of the connector duct is in fluid communication with the inlet of the headliner duct to define an airflow path through a duct interface. The airflow path extends along a longitudinal extent of the headliner through the duct interface. Embodiments of the present disclosure may include one or a combination of the following features:

the duct interface is disposed on the radiused edge of the headliner;
a side of the connector duct disposed proximate to the headliner defines a curve, wherein the curve follows the radiused edge of the headliner;
the headliner duct extends partially through the outlet such that the connector duct overlaps the headliner duct;
the inlet has a first side and a second side, wherein the first side is disposed over the first surface of the headliner and the second side is disposed over the second surface of the headliner, and wherein the second side has a greater height than the first side to maximize airflow through the inlet;
the outlet is defined on a single plane;
a side of the connector duct overlaps a side of the headliner duct to define the duct interface;
each of the inlet and the outlet are disposed on the radiused edge of the headliner;
a side of the connector duct that is disposed proximate the headliner includes a first portion disposed over the first surface of the headliner and a second portion disposed over the second surface of the headliner, wherein a curve following a radius of the radiused edge is defined between the first portion and the second portion; and
the radiused edge is disposed proximate an outer edge of the headline.

According to various examples, a method of manufacturing a vehicle air duct interface includes: proposing an angled cut plane along a radiused edge of a headliner; defining an intersection between the headliner and the angled cut plane; sweeping a surface of the headliner along the intersection; forming a headliner duct utilizing a sweep surface; blow molding a connector duct; and cutting the connector duct along the angled cut plane to define an outlet. Embodiments of the present disclosure may include one or a combination of the following features:

adjusting the sweep surface in response to a thickness of the headliner duct and a thickness of the headliner; and
adjusting the angled cut plane to a predefined angle to provide overlap between the connector duct and the headliner duct.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle headliner air duct assembly, comprising:
   a headliner having a first surface and a second surface, wherein a radiused edge is defined between the first surface and the second surface;
   a headliner duct coupled to the first surface and the second surface of the headliner, wherein the headliner duct defines an inlet, wherein the inlet is disposed on the radiused edge; and
   a connector duct coupled to a vehicle body and at least partially overlapping the headliner duct proximate to the inlet to form a duct interface, wherein the connector duct defines an outlet disposed on the radiused edge, wherein the outlet is in fluid communication with the inlet via the duct interface, and wherein the duct interface is disposed on the radiused edge.

2. The vehicle headliner air duct assembly of claim 1, wherein the outlet is defined on a single plane.

3. The vehicle headliner air duct assembly of claim 1, wherein the outlet of the connector duct and the duct interface are arranged on the headliner to direct airflow in a fore-aft direction.

4. The vehicle headliner air duct assembly of claim 1, wherein the headliner duct includes a first branch and a second branch, wherein the first branch extends in a fore-aft direction along the headliner, and wherein the second branch extends in a cross-car direction and the fore-aft direction along the headliner.

5. The vehicle headliner air duct assembly of claim 4, wherein the first branch and the second branch are at least partially disposed on opposing sides of a sunroof, and wherein the duct interface directs airflow in the fore-aft direction.

6. The vehicle headliner air duct assembly of claim 1, wherein the connector duct includes a first side and a second side, wherein the first side is disposed proximate the headliner and the second side opposes the first side, and wherein the second side extends beyond an edge of the first side that partially defines the outlet.

7. The vehicle headliner air duct assembly of claim 6, wherein the connector duct includes a third side and a fourth side extending between the first side and the second side, wherein the third side is disposed over the second surface of the headliner and the fourth side is disposed over the first surface of the headliner, and wherein the third side has a height greater than a height of the fourth side.

8. A vehicle headliner assembly, comprising:
   a headliner having a first surface and a second surface, wherein a radiused edge is defined between the first surface and the second surface;
   a headliner duct coupled to the first surface of the headliner, wherein the headliner duct defines an inlet; and
   a connector duct coupled to the headliner duct, wherein an outlet of the connector duct is in fluid communication with the inlet of the headliner duct to define an airflow path through a duct interface, and wherein the airflow path extends along a longitudinal extent of the headliner through the duct interface.

9. The vehicle headliner assembly of claim 8, wherein the duct interface is disposed on the radiused edge of the headliner.

10. The vehicle headliner assembly of claim 8, wherein a side of the connector duct disposed proximate to the headliner defines a curve, and wherein the curve follows the radiused edge of the headliner.

11. The vehicle headliner assembly of claim 8, wherein the headliner duct extends partially through the outlet such that the connector duct overlaps the headliner duct.

12. The vehicle headliner assembly of claim 8, wherein the inlet has a first side and a second side, wherein the first side is disposed over the first surface of the headliner and the second side is disposed over the second surface of the headliner, and wherein the second side has a greater height than the first side to maximize airflow through the inlet.

13. The vehicle headliner assembly of claim 8, wherein the outlet is defined on a single plane.

14. The vehicle headliner assembly of claim 8, wherein a side of the connector duct overlaps a side of the headliner duct to define the duct interface.

15. The vehicle headliner assembly of claim 8, wherein each of the inlet and the outlet are disposed on the radiused edge of the headliner.

16. The vehicle headliner assembly of claim 8, wherein a side of the connector duct that is disposed proximate the headliner includes a first portion disposed over the first surface of the headliner and a second portion disposed over the second surface of the headliner, wherein a curve following a radius of the radiused edge is defined between the first portion and the second portion.

17. The vehicle headliner assembly of claim 8, wherein the radiused edge is disposed proximate an outer edge of the headliner.

18. A method of manufacturing a vehicle air duct interface, comprising:
   proposing an angled cut plane along a radiused edge of a headliner;
   defining an intersection between the headliner and the angled cut plane;
   sweeping a surface of the headliner along the intersection;
   forming a headliner duct utilizing a sweep surface;
   blow molding a connector duct; and
   cutting the connector duct along the angled cut plane to define an outlet.

19. The method of claim 18, further comprising:
   adjusting the sweep surface in response to a thickness of the headliner duct and a thickness of the headliner.

20. The method of claim 18, further comprising:
adjusting the angled cut plane to a predefined angle to provide overlap between the connector duct and the headliner duct.

* * * * *